United States Patent [19]

Vykukal

[11] Patent Number: 5,409,331
[45] Date of Patent: Apr. 25, 1995

[54] SPACE SUIT SIZING DEVICE

[75] Inventor: Hubert C. Vykukal, Gold River, Calif.

[73] Assignee: The United States of America as represented by the National Aeronautics and Space Administration, Washington, D.C.

[21] Appl. No.: 53,940

[22] Filed: Apr. 5, 1993

[51] Int. Cl.$^6$ .............................................. F16B 7/10
[52] U.S. Cl. ..................... 403/109; 403/103; 403/104; 285/390
[58] Field of Search ................. 403/103, 104, 109, 83; 285/390, 318

[56] References Cited

U.S. PATENT DOCUMENTS

| | | | |
|---|---|---|---|
| 2,955,854 | 10/1960 | Musser | 403/109 |
| 3,058,715 | 10/1962 | Porkka | 403/109 |
| 3,393,267 | 7/1968 | Busse | 285/390 |
| 4,131,167 | 12/1978 | Richey | 403/109 |
| 4,422,704 | 12/1983 | Williams | 285/318 |
| 4,596,484 | 6/1986 | Nakatani | 403/109 |
| 4,757,778 | 7/1988 | Scaglia | 403/109 |
| 5,060,903 | 10/1991 | Schworer | 403/109 |
| 5,285,702 | 2/1994 | Hillinger | 403/109 |

*Primary Examiner*—John T. Kwon
*Attorney, Agent, or Firm*—Kenneth L. Warsh; Guy M. Miller; John G. Mannix

[57] ABSTRACT

A space suit sizing device using a ball nut and screw drive mechanism to shorten and lengthen components of a space suit. The device includes a rotatable member having an outer race formed on an inner surface thereof, and a translatable member having an inner race formed on an outer surface thereof. A plurality of recirculating balls are located in a space defined by the inner and outer races. As the rotatable member is rotated by hand, the translatable member is caused to move in and out of the rotatable member. Since one component of the space suit is connected to the translatable member, the length of this component varies in accordance with the position of the translatable member.

18 Claims, 6 Drawing Sheets

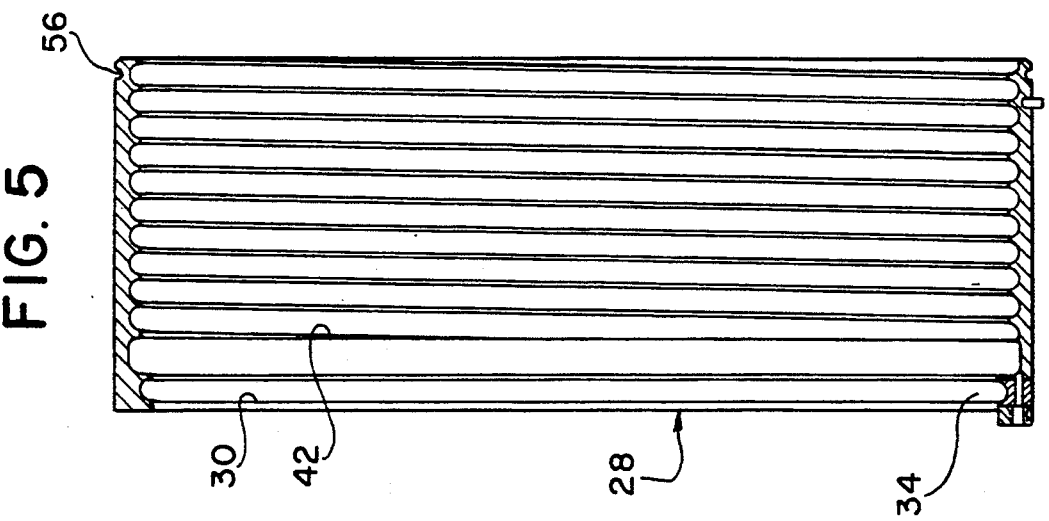
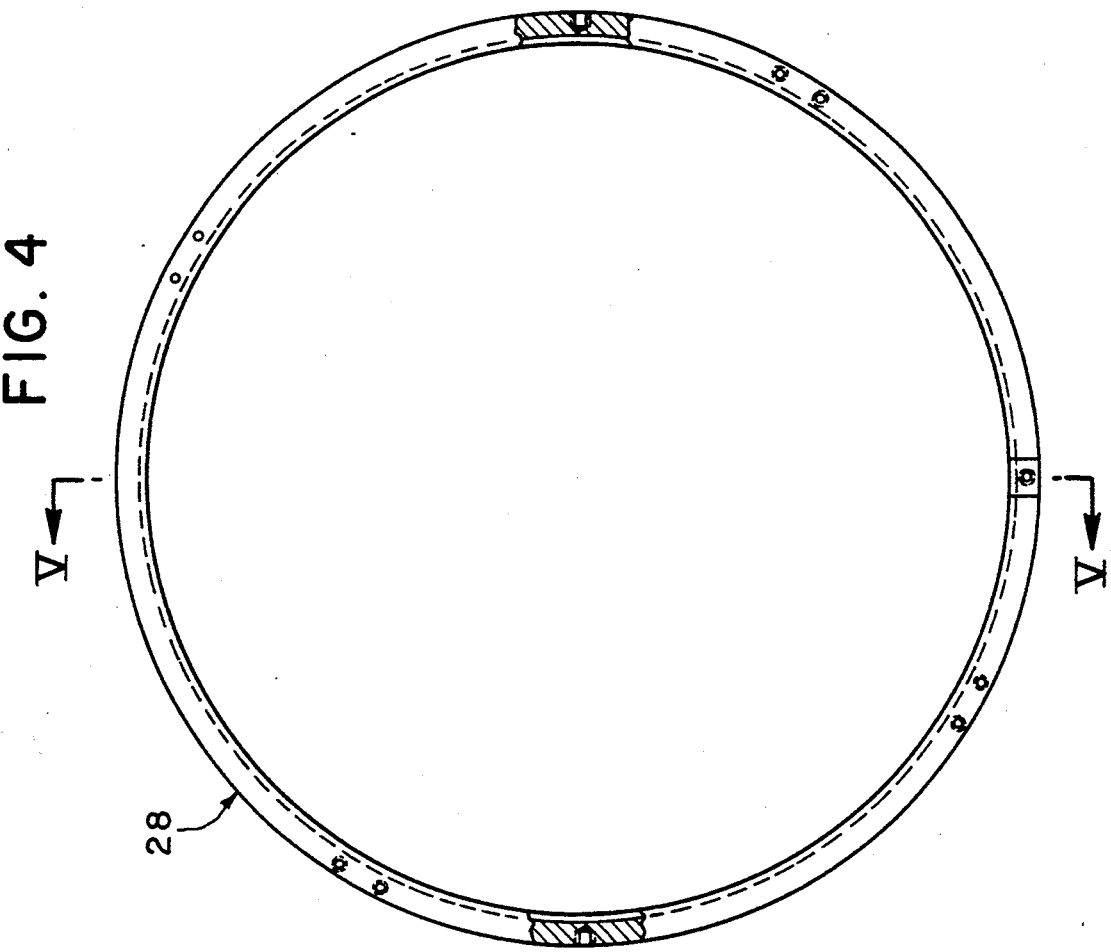

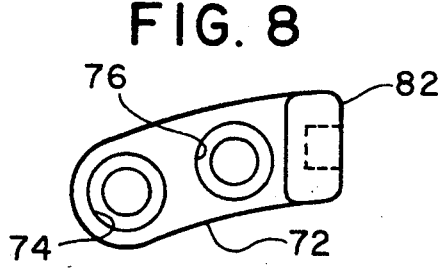
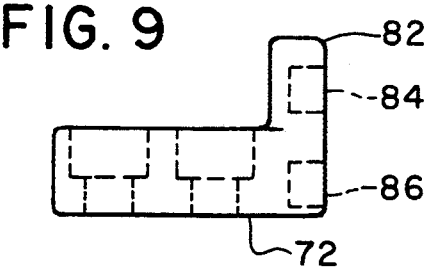
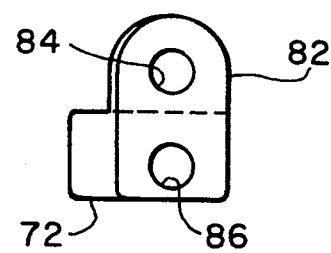
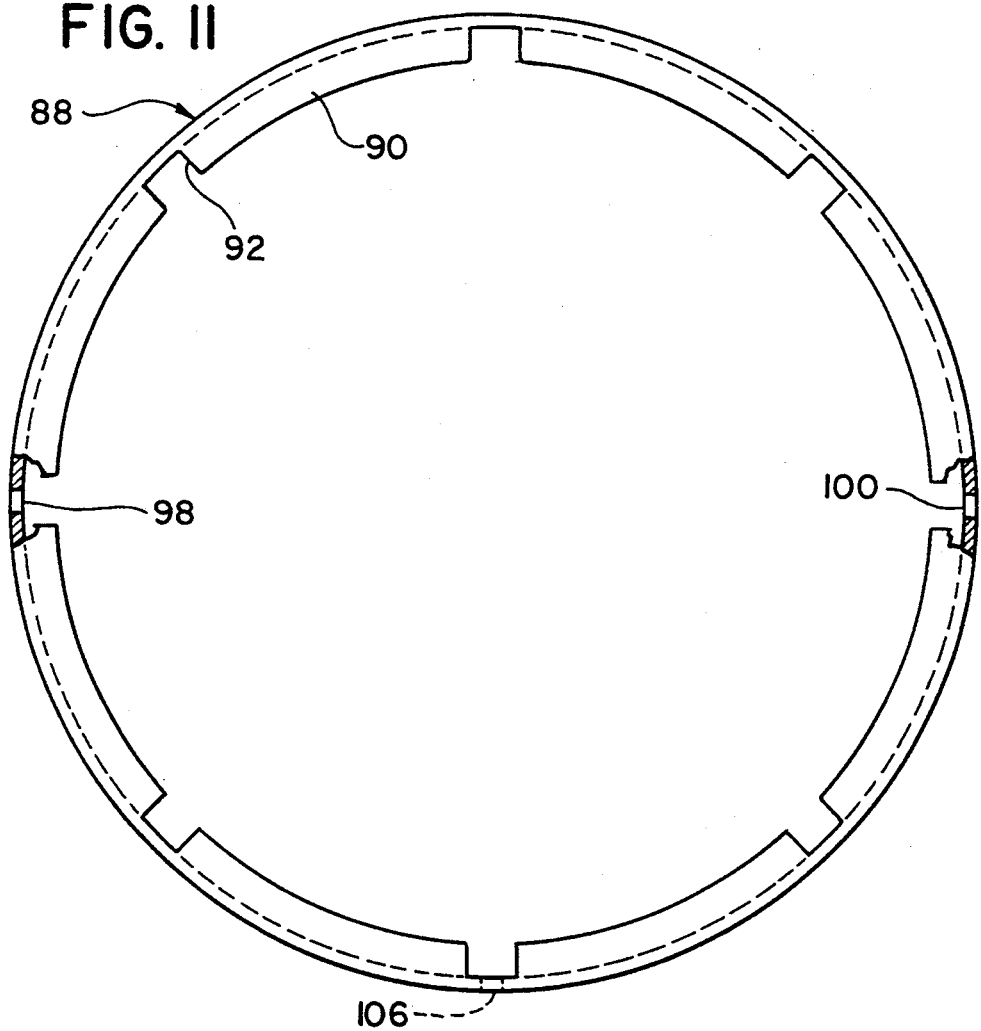

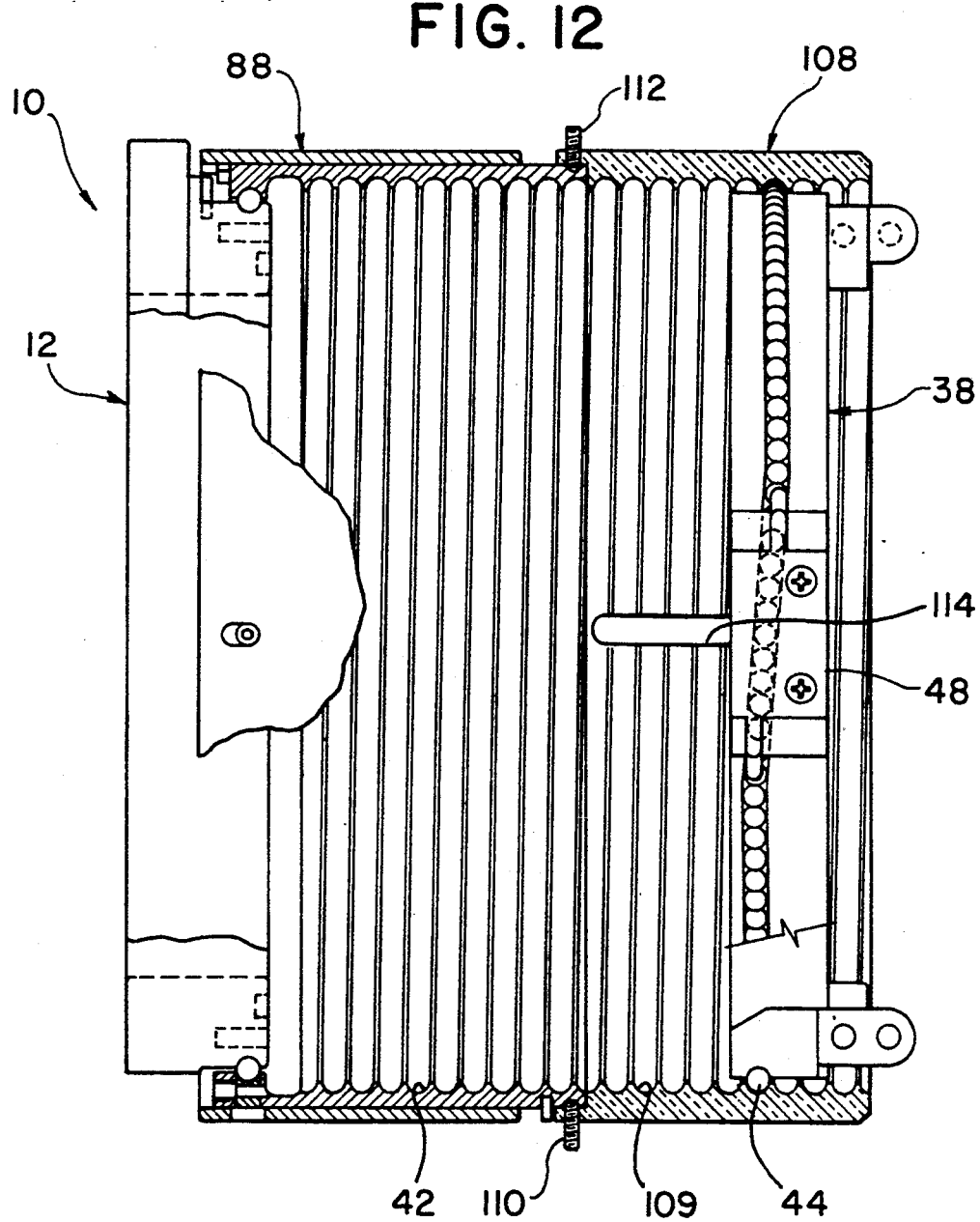

5,409,331

SPACE SUIT SIZING DEVICE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The present invention relates generally to space suits worn by astronauts and, more specifically, to a space suit sizing device which permits adjustability in the length of the arms or legs of the suit, thus permitting use by more than one astronaut.

TECHNICAL FIELD OF THE INVENTION

Space suits are generally categorized as hard or soft, depending on whether the outer skin is pliable or rigid. In either case, making sizing adjustments, so that one suit may be worn by different astronauts, is a difficult task, given the primary objective of the suit which is to maintain a pressurized environment for the astronaut.

An example of a hard suit having some measure of adjustability is shown in my prior U.S. Pat. No. 4,593,415. As described therein, the suit is provided with a torso sizing ring to permit torso adjustments. While this provides certain advantages over non-adjustable hard suits, the suit described therein must be adjusted while the suit is in an unpressurized condition. Moreover, the torso adjustment does not compensate for differences in the length of the arms and legs of different astronauts.

Soft space suits in the prior art, as well as hard suits, must be custom tailored to fit the individual astronaut. Even after custom fitting, minor adjustments in the arms and legs may be required to effect a better fit. Moreover, a soft suit capable of making size adjustments in the arms and legs so that it could conceivably fit more than one astronaut would have certain inherent advantages over non-adjustable ones. For example, fewer suits than the number of astronauts comprising the crew would provide a payload reduction, in terms of both volume and weight. Thus, a need exists for soft space suits having adjustable extremities.

SUMMARY OF THE INVENTION

An object of the present invention is to provide a space suit sizing device which is capable of permitting size adjustments that can be made while the suit is in a pressurized condition.

Another object of the present invention is to provide a space suit sizing device which permits unassisted crewman sizing for forearm and/or upper thigh regions, or buddy system sizing assistance for upper arm and/or lower leg regions.

Another object of the present invention is to provide a space suit sizing device which creates no additional potential leak paths.

Still another object of the present invention is to provide a space suit sizing device which is capable of making vernier adjustments while the suit is being worn.

These and other objects of the invention are met by providing a space suit sizing device disposed between first and second components of the space suit, the device comprising joint means for connecting the first component to the second component, and adjustment means for telescopically moving the first component relative to the second component, thus providing an adjustment of length in the first component.

Preferably, the adjustment means includes a rotatable member rotatably connected to the joint means, a translatable member connected to the first component and rotatably connected to the rotatable member, and means for imparting translatory movement in the translatable member in response to rotational movement of the rotatable member.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

FIG. 4 is a front view, partially in section, of a rotatable member of the space suit sizing device of FIG. 1;

FIG. 5 is a sectional view, taken along line V—V of FIG. 4;

FIG. 8 is a top view of a bracket half used to connect the translatable member to the arms assembly;

FIG. 9 is a side elevational view of the bracket half of FIG. 8;

FIG. 10 is an end view of the bracket half of FIG. 8;

FIG. 11 is an end view of a locking sleeve of the space suit sizing device of FIG. 1; and FIG. 12 is a vertical, longitudinal sectional view of the space suit sizing device of FIG. 1 in partial disassembly, with a ball loading fixture attached thereto.

DETAILED DESCRIPTION OF THE INVENTION

Figure 1:
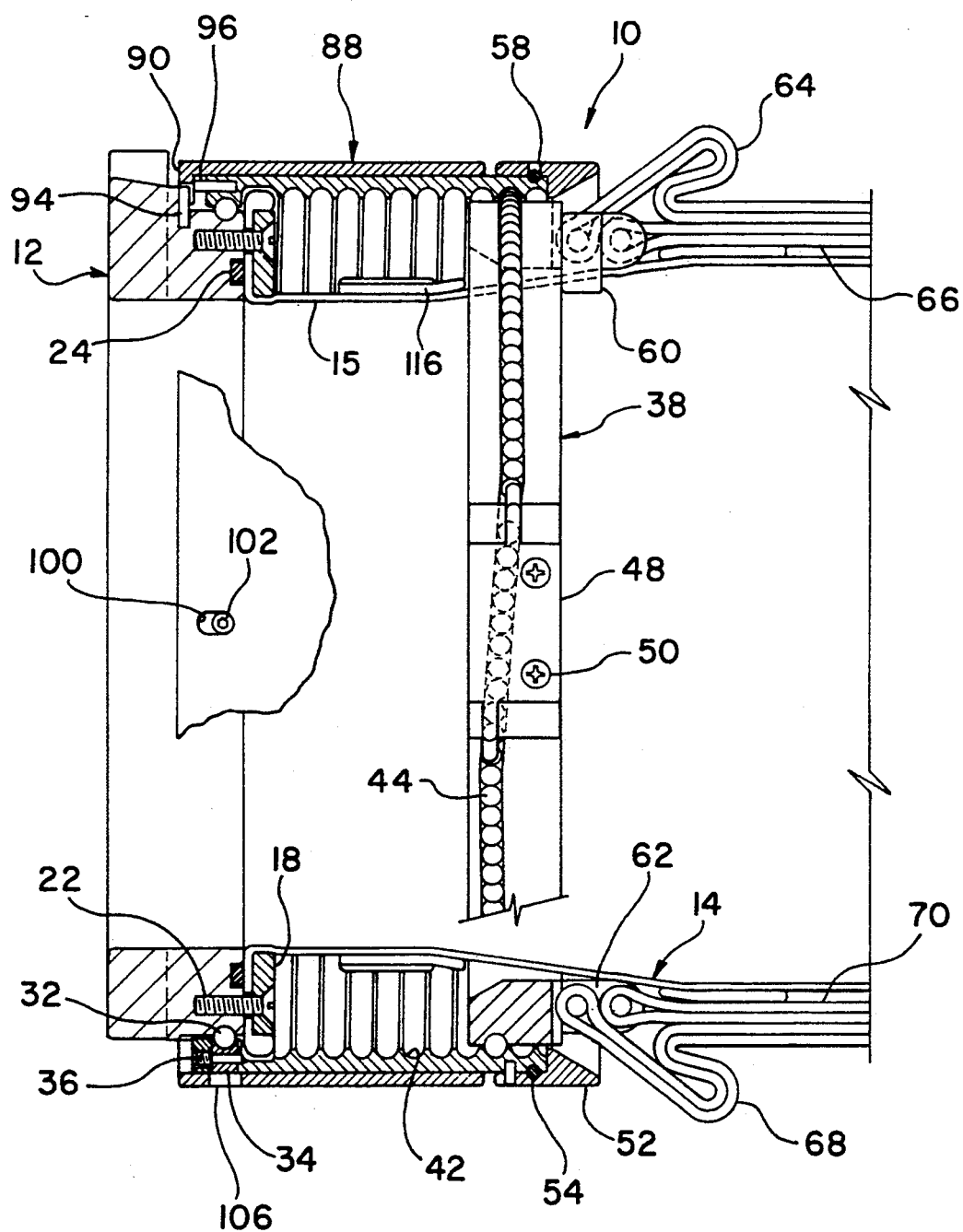
FIG. 1 is a vertical sectional view of the space suit sizing device according to a preferred embodiment of the present invention.
Figure 2:
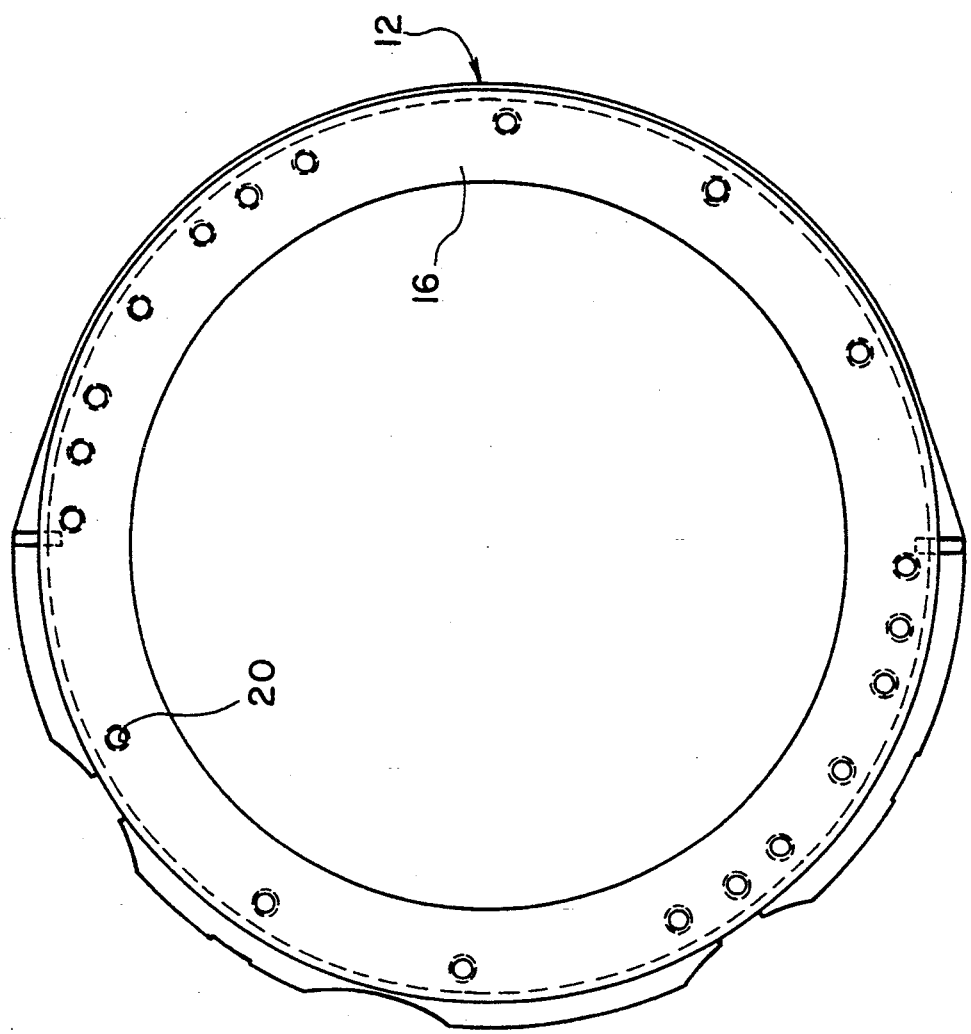
FIG. 2 is a front view of a stationary member of the space suit sizing device of FIG. 1.

Referring initially to FIG. 1, a space suit sizing device 10 includes an annular housing modification member 12 which provides a joint between first and second portions of a space suit. In use, the modification member 12 is stationary relative to the other moving parts to be described below and is thus referred to hereinafter as the "stationary member". Details of the stationary member 12 are seen in FIGS. 2 and 3.

An arm assembly 14, made of pliable fabric customarily used for soft suits, includes a sleeve 15 having a proximal end portion fixedly connected to and sealingly engaging an inner end face 16 of the stationary member 12. The opposite end of the stationary member 12 is used to connect the arm assembly to another component of the suit, such as a glove (not shown).

A ring 18 is provided with a plurality of holes which correspond in location to the location of holes 20 provided in the end face 16 of the stationary member 12. A plurality of threaded fasteners 22 detachably connect the ring 18 to the end face 16 and compress the material of the arm assembly 14 therebetween. To enhance the seal formed at the ring 18, an O-ring 24 made of elastomeric material is provided in an annular recess formed in the end face 16.

Figure 3:
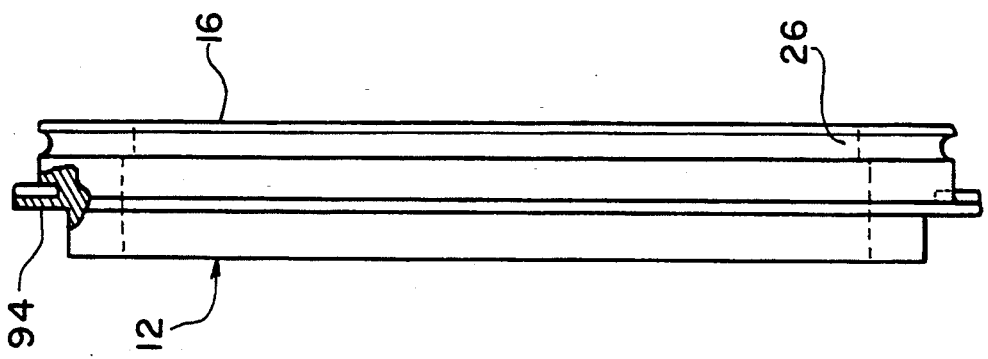
FIG. 3 is a side elevational view, partially in section, of the stationary member of FIG. 2.

As seen in FIG. 3, an annular groove 26 is formed in the cylindrical sidewall of the stationary member 12 near the end face 16. This groove provides an inner race for a ball bearing in which a rotatable member 28 is journalled to the stationary member 12. An annular groove 30 is formed near the inner end of the rotatable member 28, as seen in FIG. 5.

When assembling the device 10, the two grooves 26 and 30 are aligned to define an annular space. This space is filled through an access opening with a plurality of alternate steel and polymeric balls. After filling the space, a plug 34 is inserted into the access opening and locked into a blocking position by a screw 36. With the balls 32 in the space, the rotatable member 28 is journalled for rotational movement on the stationary member 12.

Figure 6:
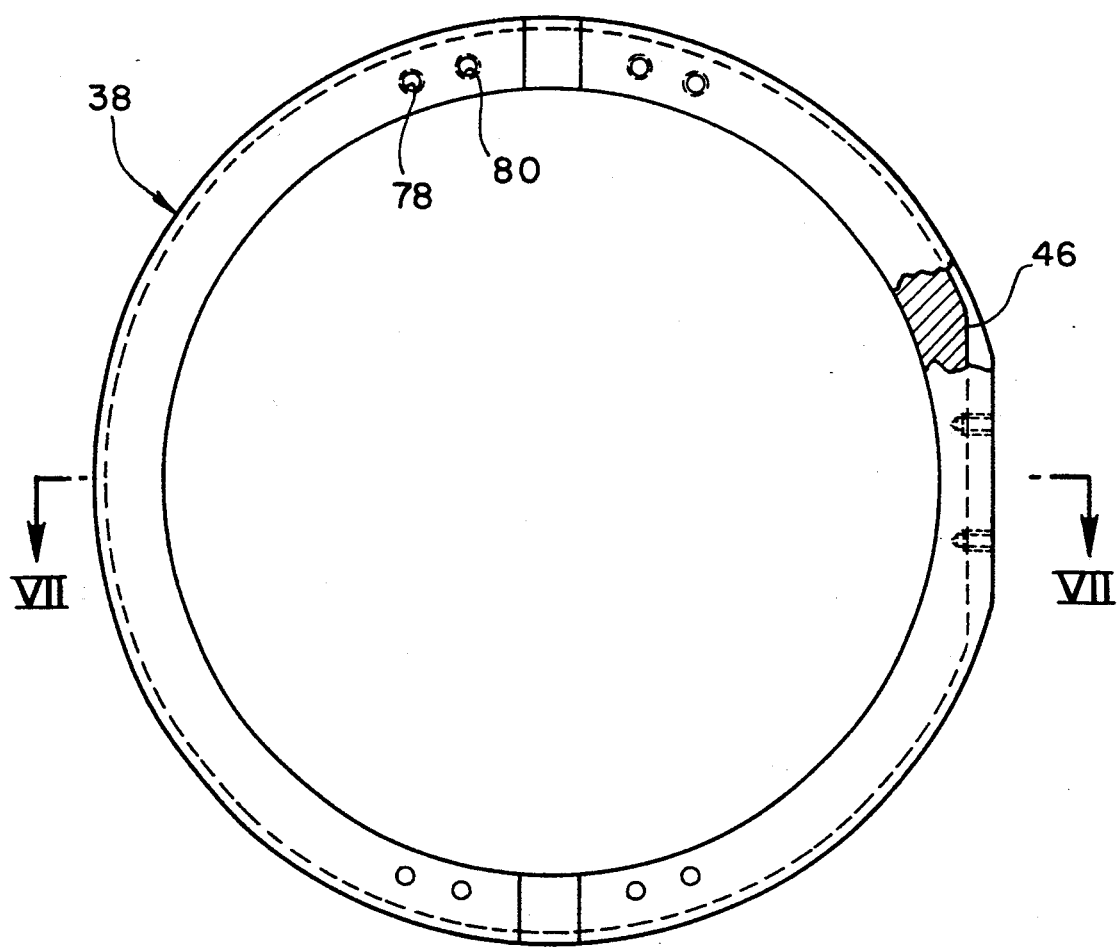
FIG. 6 is a front view of a translatable member of the space suit sizing device of FIG. 1.
Figure 7:
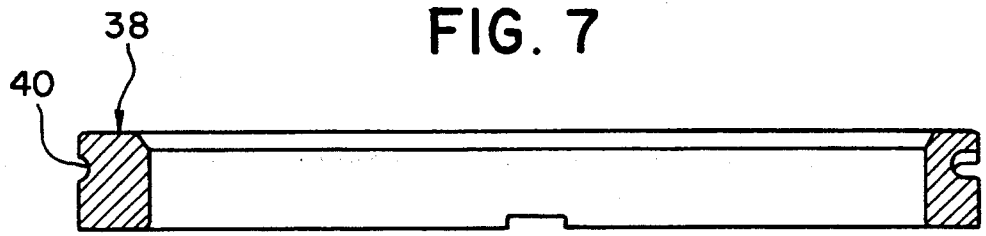
FIG. 7 is a sectional view, taken along line VII—VII of FIG. 6.

A translatable member 38, details of which can be seen in FIGS. 6 and 7, is operatively couple to and translatably movable within the rotatable member 28. An endless loop groove 40 having a slight spiral is formed in an outer cylindrical surface of the translatable member 38. The inner surface of the rotatable member 28 has a continuous, spiralling groove 42 or threaded profile which provides an outer race for a recirculating ball nut and screw-type arrangement which converts rotational movement of the rotatable member 28 into translational movement of the translatable member 38. The interior surface of the rotatable member 28 thus forms an outer race and the exterior surface of the translatable member 38 forms an inner race for a plurality of recirculating balls 44.

A cap plate 48 is connected to the translatable member 38 with threaded fasteners 50. The cap plate insures that the recirculating balls 44 are captured in the inner race 40 in the flat portion 46 of the translatable member 38 after installation.

A retaining ring 52 prevents the translatable member 38 from inadvertently separating from the rotatable member 28. The retaining ring 52 is detachably connected to the rotatable member 28 by means of a retaining wire 54 fitted into an annular space defined by a groove 56 formed in the outer surface of the rotatable member 28, as seen in FIG. 5, and a groove formed in the inner surface of the retaining ring 52. An elongated opening 58 permits ingress and egress of the wire 54 into and out of the annular space for assembly and disassembly of the device.

A pair of restraint brackets 60 and 62 are mounted on the translatable member 38 to detachably connect the arm assembly 14 to the translatable member 38. As seen in FIG. 1, the arm assembly 14 includes first and second primary restraint straps 64, 66 and 68, 70 disposed on opposite sides of the sleeve 15. Each pair of restraint straps are connected to the pliable fabric sleeve 15 at one end, and form loops at the other end. Each restraint bracket includes a pair of studs which pass through corresponding loops of the restraint straps.

FIGS. 8-10 illustrate one half of one of the brackets 60 or 62. The other half will be identical but opposite handed. Each half of the bracket includes a generally arcuate base 72 having a pair of counter-sunk bores 74 and 76 located to match a pair of threaded bores 78 and 80 formed in the translatable member 38. Threaded fasteners are used to secure the base 72 of each bracket half to the translatable member 38. A vertical support arm 82 is provided with a pair of cylindrical recesses 84 and 86 which slidably receive the mounting studs on which the loops of the restraints are mounted. The opposite ends of the studs are received in similar recesses provided in the complementary bracket half.

A locking sleeve 88, seen in FIGS. 1 and 11, is fitted over the rotatable member 28 so as to prevent inadvertent adjustment of the device 10. The sleeve 88 has a flange 90 formed at one end. The flange 90 has a plurality of notches 92 formed in an inner circumferential edge thereof. The notches interfit with locking pins 94, seen in FIGS. 1 and 3, when the sleeve 88 is in the position illustrated in FIG. 1. With the interfit of the notches 92 and protrusions 94, the rotatable member 28 cannot be rotated. To rotate the rotatable member 28, the sleeve 88 must be retracted by sliding axially toward the retainer ring 52 until the notches disengage the protrusions. Then, the sleeve 88 and rotatable member 28 are free to rotate. A plurality of springs 96 located circumferentially biases the sleeve toward the locking position. Guide slots 98 and 100 are formed on diametrically opposite sides of the sleeve 88, as seen in FIG. 11, and receive guiding pins 102 (FIG. 1) mounted on the stationary member 12.

As the sleeve 88 and rotatable member 28 are rotated, the translatable member 38 translates inwardly or outwardly of the rotatable member 28, depending on the direction of rotation of the rotatable member 28. The translatable member 38 is prevented from rotating by its connection to the arm assembly 14 and thus is caused to translate as the rotatable member 28 rotates.

Since the locking sleeve 88 must be in place before the balls 32 are loaded to interconnect the stationary member 12 and the rotatable member 28, an access opening 106 is formed in the sleeve 88 to permit loading of the balls 32.

To disassemble the device 10, the arm assembly is at first disconnected from the brackets 60 and 62 by removing the holding fasteners or screws that secure one of the bracket halves for each bracket to the translatable member 38 so that the retaining straps can be removed from the studs. Next the retaining ring 52 is removed by removing the wire 54 through its access opening. Next, as illustrated in FIG. 12, a ball loading fixture 108, prefereably made of clear plastic is fitted over the end of the rotatable member 28 and held in place with set screws 110 and 112.

The ball loading fixture 108 must be positioned such that the groove 109 provided on its inner surface matches the pitch of the groove 42 provided on the inner surface of the rotatable member 28, so that in effect the rotatable member 28 and the ball loading fixture 108 collectively define a continuous inner race. Thus, the translatable member 38, no longer prevented from rotating by its connection to the arm assembly, is rotated to advance axially into the ball loading fixture 108. Next, the arm assembly 14 is disconnected from the stationary member 12 by removing the screws 22 and detaching the ring 18.

Assembly of the device 10 is accomplished by reversing the assembly Steps described above. Also, the initial placement of the balls 44 into their operative position may be accomplished by initially placing the translatable member 38 into the ball loading fixture 108 with the cap plate 48 already in place. The balls 44 can then be loaded into a space defined by the groove 40 of the translatable member 38 and the groove 109 of the ball loading fixture 108 through an elongated opening 114 formed in the cylindrical sidewall of the ball loading fixture 108.

Referring to FIG. 1, the translatable member 38 is shown in its fully extended position, providing the maximum length adjustment for the arm assembly 14. To adjust the length, the locking sleeve is pulled toward the arm assembly 14 by an amount sufficient to disengage the notches in its flange from the locking pins of the stationary member 12 as described previously. Then, the sleeve 88 and rotatable member 28 are rotated until the translatable member 38 translates inwardly, in telescopic fashion, and draws inwardly therewith the arm the sleeve 15 of the arm assembly. The sleeve will fold over a loop tape 116 to help organize the sleeve 15 as it withdraws into the rotatable member 28.

While advantageous embodiments have been chosen to illustrate the invention, it will be understood by those skilled in the art that various changes and modifications can be made therein without departing from the scope of the invention as defined in the appended claims.

I claim:

1. A space suit sizing device comprising:
   joint means, disposed between first and second components of the space suit, for connecting the first component to the second component; and
   adjustment means for telescopically moving the first component relative to the second component, thus providing an adjustment of length in the first component.

2. A space suit sizing device according to claim 1, wherein the adjustment means includes a rotatable member rotatably connected to the joint means, a translatable member connected to the first component and rotatably connected to the rotatable member, and means for imparting translatory movement in the translatable member in response to rotational movement of the rotatable member.

3. A space suit sizing device according to claim 2, wherein the means for imparting translatory movement comprises ball nut and screw drive means.

4. A space suit sizing device according to claim 3, wherein the ball nut and screw drive means comprises an inner race formed on the translatable member, an outer race formed on the rotatable member, and a plurality of balls disposed in a space defined by the inner and outer races.

5. A space suit sizing device according to claim 2, further comprising means for locking the rotatable member in position relative to the translatable member.

6. A space suit sizing device according to claim 5, wherein the joint means comprises a stationary member.

7. A space suit sizing device according to claim 6, wherein the locking means comprises a sleeve having a flange and being fitted over the rotatable member, the flange being engaged with the stationary member in a first, locking position and being disengaged with the stationary member in a second, unlocked position.

8. A space suit sizing device according to claim 1, further comprising means for locking the rotatable member in position relative to the translatable member.

9. A space suit sizing device according to claim 8, further comprising means for separating the translatable member and balls from the rotatable member.

10. A space suit sizing device according to claim 9, wherein the separating means comprises a cylindrical sleeve having a spiral groove formed on an inner surface thereof.

11. A space suit sizing device according to claim 10, wherein the cylindrical sleeve includes means for securing the cylindrical sleeve to the rotatable member.

12. A space suit sizing device according to claim 1, wherein the joint means is a stationary member, and the adjustment means includes a rotatable member rotatably connected to the joint means, a translatable member connected to the first component and rotatably connected to the rotatable member, and means for imparting translatory movement in the translatable member in response to rotational movement of the rotatable member.

13. A space suit sizing device according to claim 12, further comprising a bearing disposed between the stationary member and the rotatable member.

14. A space suit sizing device according to claim 1, wherein the bearing comprises an inner race formed on the stationary member, an outer race formed on the rotatable member, and a plurality of ball disposed in a space defined by the inner and outer races of the bearing.

15. A space suit sizing device according to claim 1, wherein the first component is connectable to a pliable member.

16. A space suit sizing device comprising:
    a first suit component;
    a second suit component connectable to a pliable member; and
    an adjustable joint for connecting the first suit component to the second suit component.

17. A space suit sizing device according to claim 16, wherein the first suit component is a first annular member, the adjustable joint includes an annular sleeve, and the second suit component includes a second annular member axially movable within the annular sleeve.

18. A space suit sizing device according to claim 17, wherein the annular sleeve has a grooved inner surface and the second annular member has a grooved outer surface, and the first and second annular members are operatively connected through a plurality of spherical elements disposed in the grooved surfaces of the first and second annular members.

* * * * *